(12) United States Patent
Ivanov et al.

(10) Patent No.: US 9,088,211 B2
(45) Date of Patent: Jul. 21, 2015

(54) BUCK-BOOST CONVERTER WITH BUCK-BOOST TRANSITION SWITCHING CONTROL

(71) Applicant: Texas Instruments Incorporated, Dallas, TX (US)

(72) Inventors: Vadim V. Ivanov, Denton, TX (US); Rahul Prakash, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/177,558

(22) Filed: Feb. 11, 2014

(65) Prior Publication Data
US 2014/0225577 A1    Aug. 14, 2014

Related U.S. Application Data

(60) Provisional application No. 61/883,651, filed on Sep. 27, 2013, provisional application No. 61/764,904, filed on Feb. 14, 2013.

(51) Int. Cl.
*G05F 1/00* (2006.01)
*H02M 3/158* (2006.01)

(52) U.S. Cl.
CPC .................................. *H02M 3/1582* (2013.01)

(58) Field of Classification Search
USPC ........................................................ 323/271
See application file for complete search history.

(56) References Cited

U.S. PATENT DOCUMENTS 3,913,002 A * 10/1975 Steigerwald et al. ........... 363/18
4,494,010 A * 1/1985 Donnelly ......................... 307/33
(Continued)

FOREIGN PATENT DOCUMENTS

| EP | 2378650 | 10/2011 |
|----|---------|---------|
| RU | 2345472 | 1/2009  |

OTHER PUBLICATIONS

PCT Search Report mailed Feb. 14, 2014.

*Primary Examiner* — Timothy J Dole
*Assistant Examiner* — Bryan R Perez
(74) *Attorney, Agent, or Firm* — Andrew Viger; Frank D. Cimino

(57) ABSTRACT

A buck-boost regulation methodology operable, in one embodiment, with a single inductor, four-switch (S1-S4) buck-boost regulator configured for DCM. Buck-boost transition switching control is operable when inductor charge time exceeds a max charge time, and inductor discharge time exceeds a max discharge time, and includes: (a) during charge transition cycles, at the end of the max charge time, if $I_L$ is less than a predetermined peak current $I_{L\_MAX}$, switching S2 on (grounding the output side of the inductor) and S4 off, causing $I_L$ to increase (a rapid S1S2 charging current ramp), until $I_L$ reaches $I_{L\_MAX}$, and (b) during discharge transition cycles, at the end of the max charge time, if $I_L$ is greater than zero, switching S1 off and S3 on (grounding the input side of the inductor), causing $I_L$ to increase (a rapid S3S4 $I_L$ discharging current ramp), until $I_L$ reaches zero.

20 Claims, 7 Drawing Sheets

(56) References Cited

U.S. PATENT DOCUMENTS

| | | | |
|---|---|---|---|
| 5,734,258 A * | 3/1998 | Esser | 323/224 |
| 6,788,033 B2 * | 9/2004 | Vinciarelli | 323/225 |
| 7,868,595 B1 * | 1/2011 | Smith | 323/222 |
| 2004/0067740 A1 * | 4/2004 | Handa et al. | 455/127.1 |
| 2004/0201281 A1 * | 10/2004 | Ma et al. | 307/38 |
| 2004/0239299 A1 * | 12/2004 | Vinciarelli | 323/282 |
| 2006/0273768 A1 * | 12/2006 | Chen et al. | 323/224 |
| 2007/0210782 A1 * | 9/2007 | Prexl et al. | 323/288 |
| 2009/0146623 A1 * | 6/2009 | de Cremoux et al. | 323/271 |
| 2010/0039080 A1 * | 2/2010 | Schoenbauer et al. | 323/234 |
| 2011/0089917 A1 * | 4/2011 | Chen et al. | 323/282 |
| 2012/0062030 A1 * | 3/2012 | Xu et al. | 307/31 |
| 2013/0082668 A1 * | 4/2013 | Tseng et al. | 323/267 |

\* cited by examiner

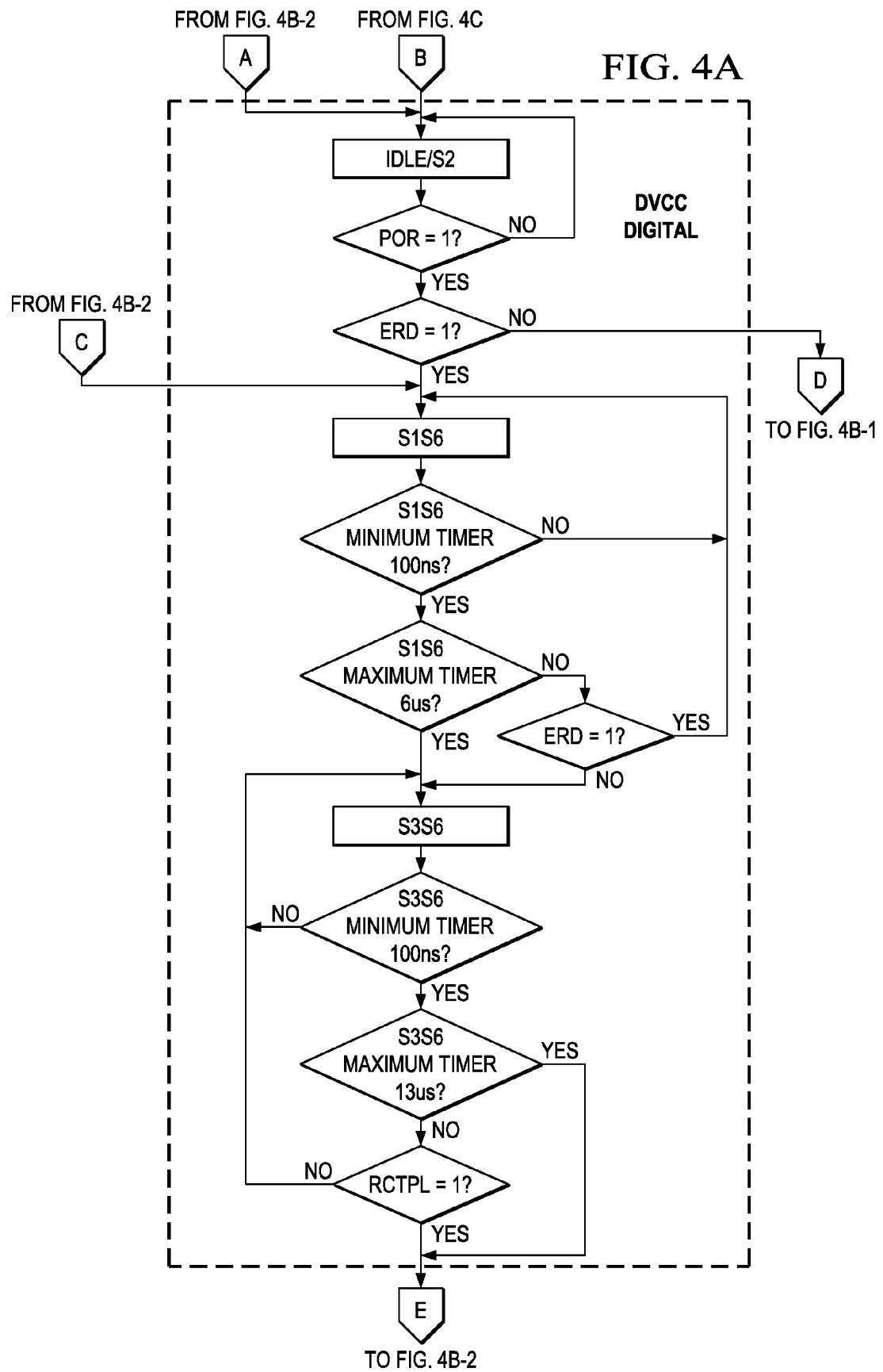

BUCK-BOOST CONVERTER WITH BUCK-BOOST TRANSITION SWITCHING CONTROL

CROSS-REFERENCE TO RELATED APPLICATIONS

Priority is hereby claimed under USC §119(e) to U.S. Provisional Application 61/883,651 and 61/764,904.

BACKGROUND

1. Technical Field

This Patent Disclosure relates generally to buck-boost switching converters/regulators, and more particularly to implementing switching control during buck-boost transitions.

2. Related Art

Buck-boost switching converter topologies typically require some switching control mechanism to ensure correct operation during transitions between buck and boost, where input and output voltages are close together and load currents are low.

One common approach is dual ramp PWM (pulse width modulation). Disadvantages of this approach include lower efficiency at the transition region due to excessive commutations, and larger Iq (quiescent or ground current resulting from DC biasing, i.e., current not available for the load).

Another common approach is using a comparator to determine whether the input voltage or the regulated output voltage is larger, and controlling a single switch during transition. Disadvantages of this approach include slow response due to "cycling", and if the unregulated input voltage goes significantly below the regulated output voltage, significant circuit stability problems can result. An alternative approach is illustrated by U.S. Pat. No. 5,734,258, which describes complex inductor coupling arrangements. Disadvantages of this approach include slower response to rapid changes in load current, and unpredictable operation when the input and output voltage are nearly equal.

Another alternative approach is illustrated in U.S. Pat. No. 6,275,016 in which switching control is provided by the clocked state machine with inputs from an error comparator and using switching history. A disadvantage of this approach is clocking which requires high Iq and lower efficiency at low load currents, as well as chaos effects and sub-harmonic oscillations.

BRIEF SUMMARY

This Brief Summary is provided as a general introduction to the Disclosure provided by the Detailed Description and Figures, summarizing some aspects of the disclosed invention. It is not a detailed overview of the Disclosure, and should not be interpreted as identifying key elements of the invention, or otherwise characterizing the scope of any invention disclosed in this Patent Document.

The Disclosure describes apparatus and methods for buck-boost switching control (regulation), including switching control during buck-boost transitions. The buck-boost regulation methodology can be adapted for single inductor buck-boost converter architectures operating in DCM (discontinuous conduction mode), In one embodiment, the buck-boost regulation methodology can be adapted to a buck-boost regulator that includes an inductor coupled at a first inductor node to the input power source, a second inductor node to an output node, an output capacitor coupled to the output node in parallel with the load, and includes a switching network with a switch S1 coupled between the input power source and the first inductor node, a switch S2 coupled between the second inductor node and ground, a rectification component S3 coupled between the first inductor node and ground, configured to enable forward current in a forward direction, block reverse current in a reverse direction, a rectification component S4 coupled between the second inductor node and the output node, and configured to enable forward current from the second inductor node to the output node and to block reverse current from the output node to the second inductor node.

The buck-boost regulation methodology includes controlling the switching network to control inductor current $I_L$, including inductor charge and discharge, to provide power conversion in three modes: (a) a buck mode providing down conversion when the input power is greater than the regulated output power by a buck transition parameter corresponding to a predetermined max charge time; (b) a boost mode providing up conversion when the input power is less than the regulated output power by a boost-transition parameter corresponding to a predetermined max discharge time; and (c) a transition mode enabled when the difference between the input power and the regulated output power corresponds to a buck-boost transition condition as represented by an inductor charge time that exceeds the max charge time, and an inductor discharge time the exceeds the max discharge time. During the transition mode, the switching network is controlled to transition between charge and discharge transition cycles.

During the charge cycle, inductor charging is controlled by: (a) switching S1 on and S2 off, with the rectification component S3 configured to block reverse current from the input power source to ground, and with rectification component S4 conducting forward current, such that inductor current $I_L$ charges the inductor with an S1S4A $I_L$ current ramp; (b) determining, at the end of the max charge time, that $I_L$ is less than a predetermined peak current $I_{L\_MAX}$; and in response (c) switching S2 on to ground the second inductor node (rectification component S4 blocking any reverse current from the output node to the second inductor node), so that $I_L$ increases to an S1S2 $I_L$ current ramp greater in magnitude than the S1S4A $I_L$ current ramp, until $I_L$ reaches $I_{L\_MAX}$.

During the discharge cycle, inductor discharge is controlled by: (a) switching S1 on and S2 off, with the rectification component S3 configured to block reverse current from the input power source to ground, and with rectification component S4 conducting forward current, such that inductor current $I_L$ discharges the inductor with an S1S4B $I_L$ current ramp; (b) determining, at the end of the max discharge time, that $I_L$ is greater than zero; and in response, (c) switching S1 off, with the rectification component S3 configured to connect the first inductor node to ground (and with rectification component S4 conducting forward current), so that $I_L$ increases to an S3S4 $I_L$ current ramp greater in magnitude than the S1S4A $I_L$ current ramp, until $I_L$ reaches zero.

In another embodiment, the buck-boost regulation methodology can be adapted for single inductor buck-boost converter architectures with a four transistor switching network, including controlling the switching network by: (a) generating a zero crossing signal ZC3 indicating when the inductor current $I_L$ through S3 and the first inductor node is zero, (b) generating a zero crossing signal ZC4 indicating when the inductor current $I_L$ through the second inductor node and S4 is zero; (c) generating an $I_L$ sense signal representative of inductor current $I_L$; (d) generating a voltage regulation error signal representative of a difference between an output voltage supplied to the load (based on $I_L$) and the regulated output voltage; (e) generating an $I_L$ regulation error signal based on the $I_L$ sense signal, and the voltage regulation error signal; and (f) switching S1-S4 based on the zero crossing signals ZC1 and ZC2, and the $I_L$ regulation error signal, such that that the switching regulator supplies inductor current $I_L$ corresponding to the regulated output voltage. For this embodiment, the IL regulation error signal can be generated by: (a) generating an $I_L$ sense current representative of inductor current $I_L$; (b) generating a voltage regulation error current corresponding to the difference between the output voltage supplied to the load (based on $I_L$) and a reference voltage corresponding to the regulated output voltage; (c) generating an $I_L$ regulation current based on a subtraction of the $I_L$ the voltage regulation current signal and the IL sense current; and (d) generating the $I_L$ regulation error signal based on the $I_L$ regulation current relative to a comparator reference. In another embodiment, the comparator reference can correspond to a predetermined hysteresis level.

In an embodiment of a buck-boost converter configured to implement the buck-boost regulation methodology, including controlling switching during buck-boost transitions, the converter includes: (a) a switching network coupled to first and second inductor nodes configured to couple to an inductor, and an output node configured to couple to an output capacitor, and (b) a switching controller configured to control the switching network to control inductor current $I_L$, including inductor charge and discharge. The switching network includes: (a) a switch S1 configured to couple to the input power source, and coupled to the first inductor node, (a) a switch S2 coupled between the second inductor node and ground, (a) a rectification component S3 coupled between the first inductor node and ground and configured to conduct forward current in a forward direction, and block reverse current in a reverse direction, and (b) a rectification component S4 coupled between the second inductor node and the output node, and configured to conduct forward current from the second inductor node to the output node and to block reverse current from the output node to the second inductor node.

The switching controller is configured to control the switching network to provide power conversion in three modes: (a) a buck mode providing down conversion when the input power is greater than the regulated output power by a buck transition parameter corresponding to a predetermined max charge time; (b) a boost mode providing up conversion when the input power is less than the regulated output power by a boost-transition parameter corresponding to a predetermined max discharge time; and (c) a transition mode enabled when the difference between the input power and the regulated output power corresponds to a buck-boost transition condition as represented by an inductor charge time that exceeds the max charge time, and an inductor discharge time the exceeds the max discharge time. During the transition mode, the switching controller transitions between charge and discharge transition cycles.

During the charge cycle, the switching controller controls inductor charging by: (a) switching S1 on and S2 off, with the rectification component S3 configured to block reverse current from the input power source to ground, and with rectification component S4 conducting forward current, such that inductor current $I_L$ charges the inductor with an S1S4A $I_L$ current ramp, (b) determining, at the end of the max charge time, that $I_L$ is less than a predetermined peak current $I_{L\_MAX}$, and in response (c) switching S2 on to ground the second inductor node (rectification component S4 blocking any reverse current from the output node to the second inductor node), so that $I_L$ increases to an S1 S2 $I_L$ current ramp greater in magnitude than the S1S4A $I_L$ current ramp, until $I_L$ reaches $I_{L\_MAX}$.

During the discharge cycle, the switching controller controls inductor discharge by: (a) switching S1 on and S2 off, with the rectification component S3 configured to block reverse current from the input power source to ground, and with rectification component S4 conducting forward current, such that the inductor discharges with an S1S4B $I_L$ current ramp, (ii) determining, at the end of the max charge time, that $I_L$ is greater than zero, and in response (ii) switching S1 off, with the rectification component S3 configured to connect the first inductor node to ground (and with rectification component S4 conducting forward current), so that $I_L$ increases to an S3S4 $I_L$ current ramp greater in magnitude than the S1S4A $I_L$ current ramp, until $I_L$ reaches zero.

In another embodiment, the buck-boost regulation methodology can be adapted for a single-inductor buck-boost converter configured with a four transistor switching network, where the switching controller includes: (a) zero crossing comparators ZCC3 and ZCC4 configured to provide respective zero crossing signals ZC3 and ZC4, and to control switching of respectively S3 and S4; (b) a state machine configured to control switching of S1 and S2 based on the zero crossing signals ZC3 and ZC4, and an $I_L$ regulation error signal; and (c) $I_L$ regulation circuitry configured to provide the $I_L$ regulation error signal based on (i) an $I_L$ sense signal representative of the inductor current $I_L$, and (ii) a voltage regulation error signal representative of a difference between an output voltage supplied to the load (based on $I_L$), and the regulated output voltage; such that (d) the switching converter supplies inductor current $I_L$ corresponding to the regulated output voltage. For this embodiment, the switching controller can include: (a) $I_L$ sense circuitry configured to provide an $I_L$ sense current representative of the inductor current $I_L$; (b) $V_{OUT}$ sense circuitry including (i) a reference voltage corresponding to the regulated output voltage; and (ii) a transconductance amplifier configured to output a voltage regulation error current corresponding to a difference between an output voltage supplied to the load (based on $I_L$), and the reference voltage; and (c) $I_L$ regulation circuitry that includes (i) a current subtraction node coupled to the output of the transconductance amplifier and the $I_L$ sense circuitry, such that a resulting $I_L$ regulation current out of the current subtraction node corresponds to a difference between the voltage regulation error current and the IL sense current; and (ii) an error comparator configured to provide the $I_L$ regulation error signal based on the $I_L$ regulation current relative to a comparator reference. For this embodiment, the comparator reference can corresponds to a predetermined hysteresis level.

Other aspects and features of the claimed invention will be apparent to those skilled in the art from the following Disclosure.

BRIEF DESCRIPTION OF THE DRAWINGS

FIGS. 4A-4C illustrate example flow diagrams representing a state machine implementation of a buck-boost switching control methodology, including buck-boost transition switching control, according to the invention, as can be adapted for single inductor SISO/SIMO buck-boost regulators, such as illustrated in FIGS. 1A/1B providing regulated output voltages AVCC, DVCC and AVSS: (4A) illustrates an example buck-boost switching control methodology for the SIMO voltage regulation application illustrated in FIG. 1B (AVCC, DVCC and AVSS); (4B) expands the regulation flow for AVCC regulation, including buck-boost transition switching control; and (4C) expands the regulation flows for DVCC and AVSS regulation.

DETAILED DESCRIPTION

This Description and the Figures disclose example embodiments and applications that illustrate various features and advantages of the invention, aspects of which are defined by the Claims. Known circuits, functions and operations are not described in detail to avoid unnecessarily obscuring the principles and features of the invention.

The buck-boost regulation (switching control) methodology, including buck-boost transition switching control, according to the invention, can be adapted for single inductor buck-boost switching converter/regulator architectures operating in DCM (discontinuous conduction mode). Converter and regulator can be used interchangeably, although, in general, a regulator includes converter circuitry together with an appropriate inductor and output capacitor (i.e., for typical applications, the inductor and output capacitor will not be integrated with the converter circuitry). The converter circuitry includes a switching network coupled to the inductor and an associated switching controller, which can be integrated, or the switching network can be implemented separately from a switching controller implemented, for example, as an integrated circuit. For brevity, the Description in connection with FIGS. 1A/1B, 3 and 5A/5B will referred to the illustrated example embodiments as regulators.

Figure 1A:
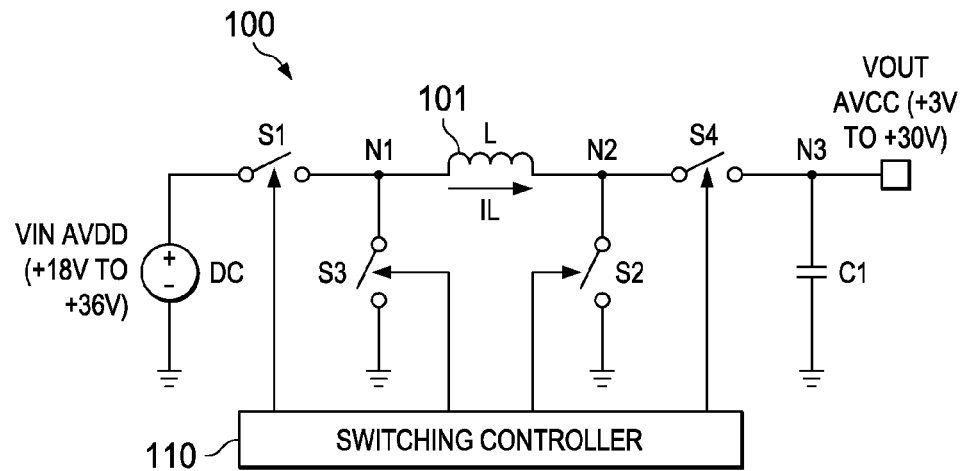
FIGS. 1A and 1B, illustrate example single inductor buck-boost converter/regulator architectures, adaptable for use with the buck-boost switching control (regulation) methodology, including buck-boost transition switching control, according to the invention: (1A) illustrates an example embodiment of a single input single output (SISO) buck-boost converter/regulator architecture; and (1B) illustrates an example embodiment of a single input, multiple output (SIMO) buck-boost converter/regulator architecture.
Figure 1B:
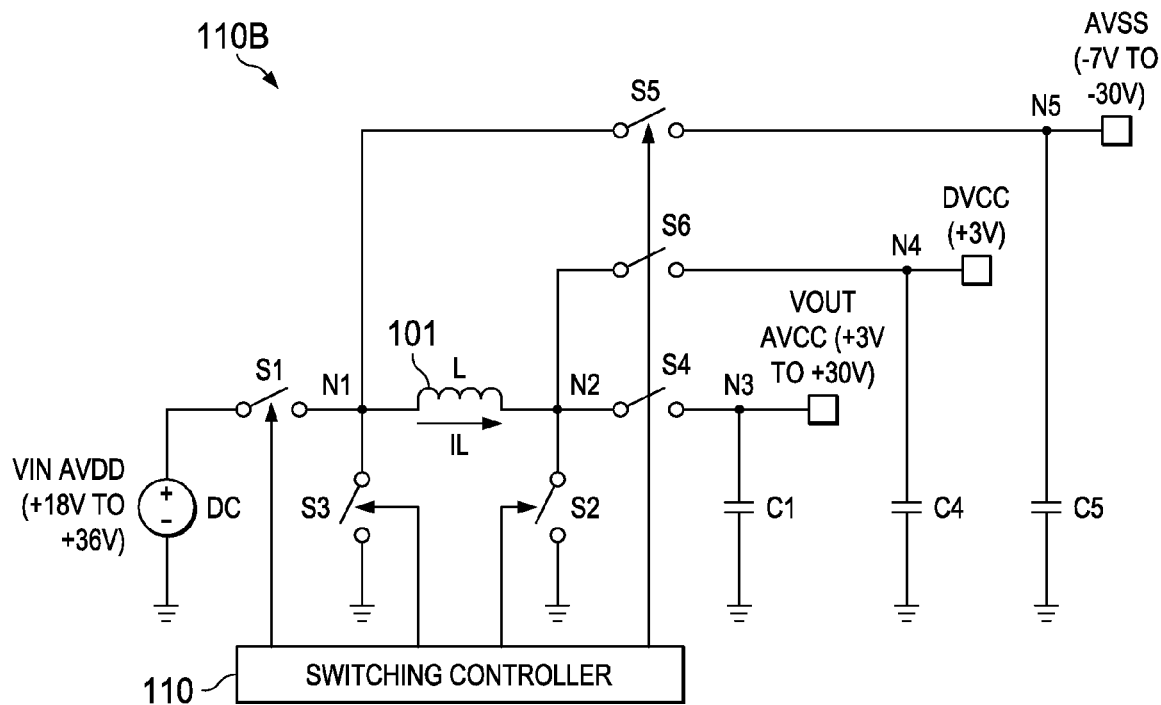

FIGS. 1A and 1B illustrate example embodiments of single inductor buck-boost regulator, adaptable for use with the buck-boost regulation methodology, including buck-boost transition switching control, according to the invention. FIG. 1A illustrates an example embodiment of a single input single output (SISO) buck-boost regulator 100A; and FIG. 1B illustrates an example embodiment of a single input, multiple output (SIMO) buck-boost regulator 100B.

The single inductor buck-boost regulators 100A/100B both include a transistor switching network S1-S4 and a switching controller 110. The switching network for the SIMO regulator 100B includes additional switches S5 and S6 associated with the additional regulated outputs. The switching controller controls the switching network in accordance with the buck-boost regulation methodology, including buck-boost transition switching, according to the invention.

Referring to FIG. 1A, the example embodiment of a SISO buck-boost regulator 100A is configured for converting input power represented by $V_{IN}$ (for example, AVDD +18V to +36V) into a (single) regulated positive output represented by $V_{OUT}$ (for example, AVCC +3V to +30V). Regulator 100A includes a single inductor 101 and an output capacitor C1. Inductor 101 is coupled between inductor nodes N1 and N2, and capacitor C1 is coupled to an output node N3.

Switching network S1-S4 is coupled to the inductor nodes N1/N2 and the output node N3. It includes a switch S1 configured to couple to an input power source/terminal $V_{IN}$, and coupled to inductor node N1, and a switch S2 coupled between inductor node N2 and ground. It also includes rectification components S3 and S4, implemented in this example embodiment as transistor switches, with appropriate control as described below. A switch S3 is coupled between the first inductor node and ground, and a switch S4 is coupled between the second inductor node and the output node. Embodiments in which S3 and S4 can be implemented as diodes are discussed in connection with FIGS. 5A/5B.

Referring to FIG. 1B, an example embodiment of a SIMO buck-boost regulator 110B is configured for converting input power represented by $V_{IN}$ (for example, AVDD +18V to +36V) into multiple positive and negative regulated output voltages, for example: AVCC +3V to +30V at output node N3 (output capacitor C1); DVCC +3V at output node N4 (output capacitor C4); and AVSS −7V to −30V at output node N5 (output capacitor C5).

Figure 2:
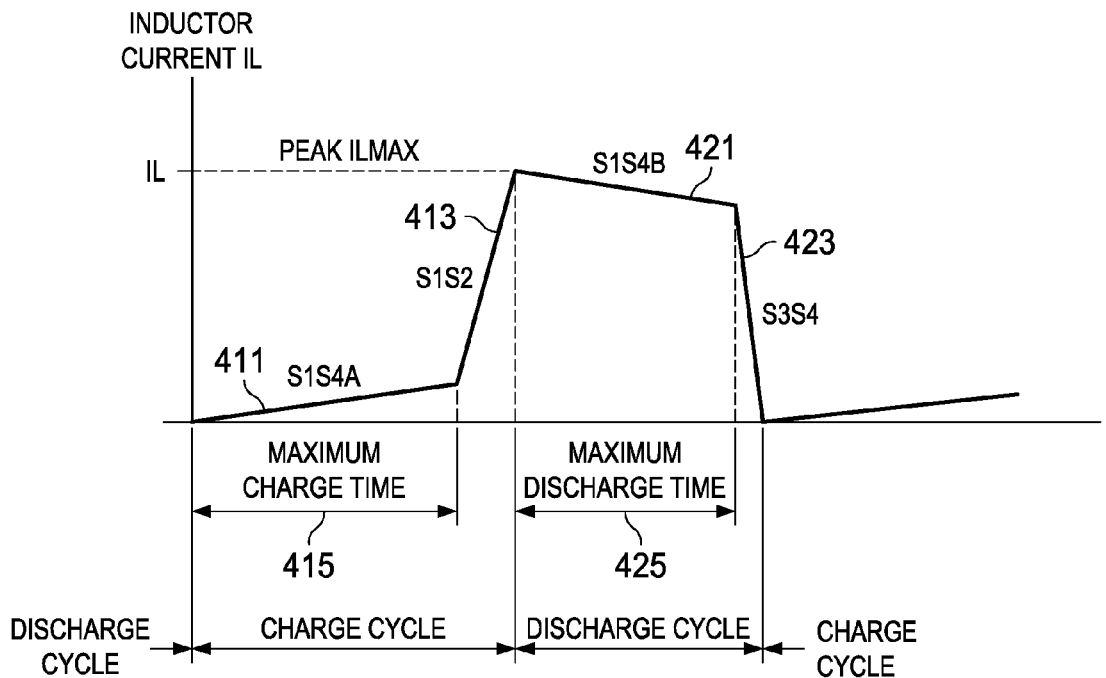
FIG. 2 illustrates an example embodiment of a buck-boost transition switching control methodology according to the invention, including charge and discharge transition cycles, respectively for inductor charging and discharging during buck-boost transitions.

FIG. 2 is a functional illustration of the buck-boost transition switching control methodology according to the invention, as implemented in a switching controller for a four-transistor switching network, for example, FIGS. 1A/1B (S1-S4).

In brief overview, for such four-transistor embodiments, the buck-boost transition switching methodology provides switching control during buck-boost transition conditions represented by an inductor charge time that exceeds a predetermined max charge time, and an inductor discharge time the exceeds a predetermined max discharge time. The methodology transitions between a charge and discharge transition cycles to control respectively the charging and discharging of the buck-boost inductor. During charge cycles, the switching controller: (a) switches S1S4 on and S2S3 off, providing inductor current $I_L$ that charges the inductor with an S1S4A $I_L$ current ramp during the max charge time, and then (b) at the end of the max charge time, if $I_L$ is less than a predetermined peak current $I_{L\_MAX}$, switches S2 on and S4 off, so that $I_L$ increases to an S1S2 $I_L$ current ramp greater in magnitude than the S1S4A $I_L$ current ramp, until $I_L$ reaches $I_{L\_MAX}$. During discharge cycles, the switching controller: (a) switches S1S4 on and S2S3 off, and the inductor discharges with an S1S4B $I_L$ current ramp, and then (b) at the end of the max discharge time, if $I_L$ is greater than zero, switching S1 off and S3 on, so that $I_L$ increases to an S3S4 $I_L$ current ramp greater in magnitude than the S1S4A $I_L$ current ramp, until $I_L$ reaches zero.

Referring to FIGS. 2 and 1A, the buck-boost transition switching control methodology according to the invention is operable to control switching network S1-S4 to control inductor current $I_L$ through inductor 101, including inductor charging and discharging, and thereby to provide power conversion in three modes: buck mode, boost mode and transition mode. The buck and boost modes are conventional: (i) the buck mode provides step-down power conversion when the input power is greater than the regulated output power by a buck transition parameter corresponding to a predetermined max charge time; and (ii) the boost mode provides step-up power conversion when the input power is less than the regulated output power by a boost-transition parameter corresponding to a predetermined max discharge time.

The buck-boost transition mode operates during buck-boost transition conditions, when the difference between the input power and the regulated output power corresponds to a buck-boost transition condition as represented by an inductor charge time that exceeds the max charge time, and an inductor discharge time the exceeds the max discharge time. During the transition mode, the switching controller transitions between charge and discharge transition cycles, respectively controlling inductor charging and discharging.

The charge cycle (inductor charge) has two phases: (a) during an S1S4A phase, switches S1 and S4 are on, and S2/S3 are off, and (b) during an S1S2 phase, S2 is switched on and S4 is switched off (S3 remains off to block reverse current from the VIN to ground). During the S1S4 phase, inductor current $I_L$ ramps to an S1S4A $I_L$ current ramp, charging the inductor. At the end of the max charge time, the switching controller (a) determines that the inductor current $I_L$ is less than a predetermined peak current $I_{L\_MAX}$, and in response (b) switches to the S1S2 phase, switching S2 on to ground inductor node N2, and switching S4 off to block any reverse current from the output node N3. Inductor current $I_L$ increases to an S1S2 $I_L$ current ramp that is greater in magnitude than the S1S4A $I_L$ current ramp, charging the inductor When $I_L$ ramps to $I_{L\_MAX}$, the switching controller can transition to the discharge transition cycle.

The discharge cycle (inductor discharge) has two phases: (a) during an S1S4B phase, switches S1 and S4 are on, and S2/S3 are off, and (b) during an S3S4 phase, S1 is switched off and S3 is switched on (S4 remains on to conduct forward current to the output node N3). During the S1S4 phase, the inductor discharges with an S1 S4B $I_L$ current ramp. At the end of the max discharge time, the switching controller (a) determines that inductor current $I_L$ is greater than zero, and in response, (b) switches to the S3S4 phase, switching S1 off and S3 on to ground inductor node N1. Inductor current $I_L$ increases to an S3S4 $I_L$ current ramp greater in magnitude than the S1S4A $I_L$, discharging the inductor. When $I_L$ ramps to zero, the switching controller can transition to the charge transition cycle.

Figure 3:
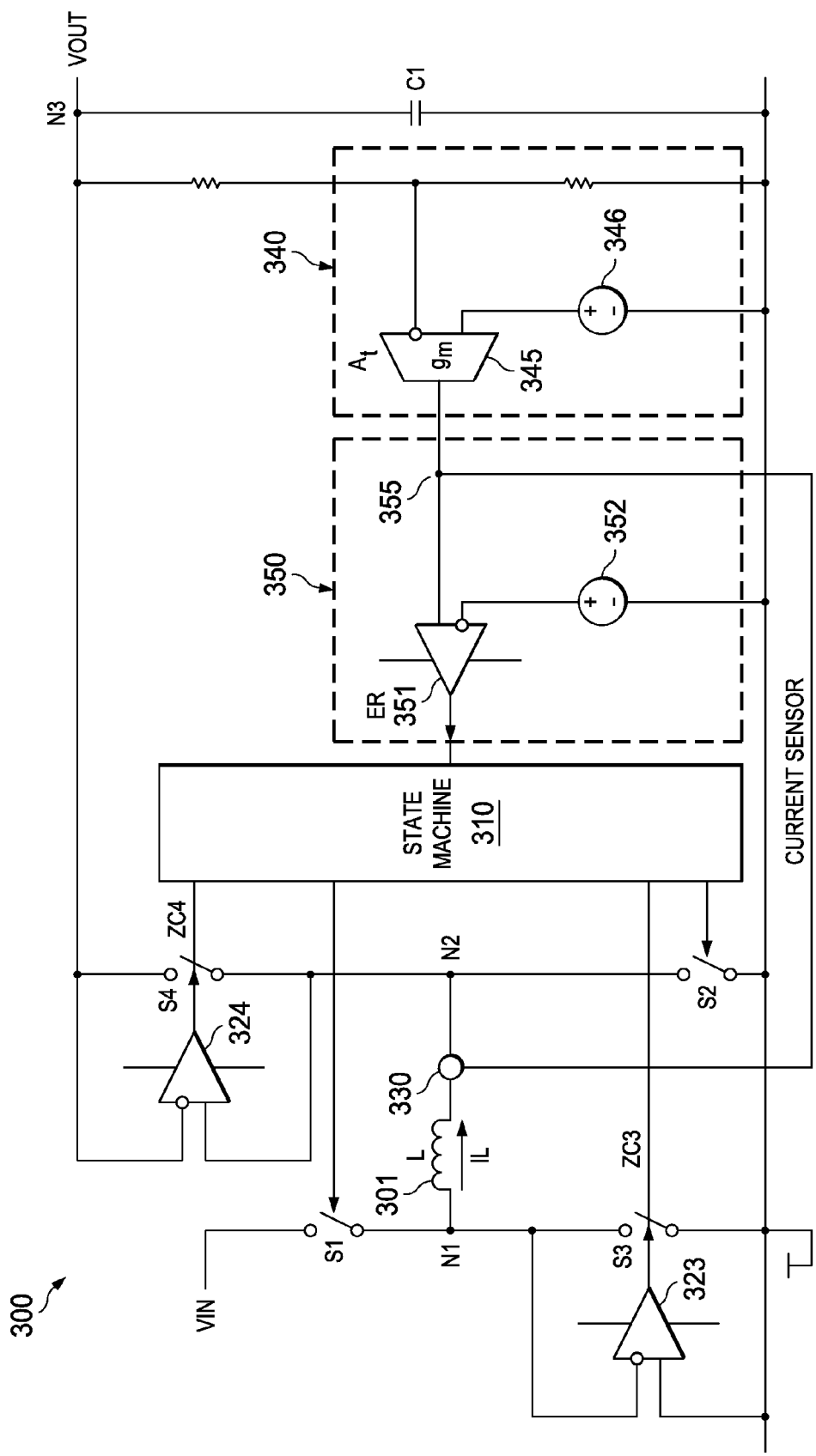
FIG. 3 illustrates an example embodiment of a buck-boost regulator, with a four-transistor switching network, and including switching control provided by a state machine and zero crossing comparators, the state machine implementing a buck-boost switching control methodology, including buck-boost transition switching control, according to the invention.

FIG. 3 illustrates an example embodiment of a single inductor buck-boost regulator 300, configured to implement a buck-boost regulation methodology, including buck-boost transition switching control, according to the invention. Regulator 300 includes a four-transistor switching network S1-S4, and a switching controller implemented with an asynchronous (non-clocked) state machine 310 and two zero crossing comparators 323 and 324. The state machine controls the switching of S1 and S2, and the zero crossing comparators control, respectively, the switching of S3 and S4.

Zero crossing comparator (ZCC3) 323 monitors the inductor current $I_L$ through S3 and inductor node N1. Zero crossing comparator (ZCC4) 324 monitors the inductor current $I_L$ through S4 and inductor node N2. ZCC3 provides a zero crossing signal ZC3 indicating when the inductor current $I_L$ through S3 and the inductor node N1 is zero. ZCC4 provides a zero crossing signal ZC4 indicating when the inductor current $I_L$ through the inductor node N2 and S4 is zero. During the discharge transition cycle, ZCC3 and ZCC4 are configured to switch S3 and S4 from conducting to non-conducting in response to the respective zero crossing signals ZC3 and ZC4. Zero crossing signals ZC3 and ZC4 are also provided as inputs to state machine 311. Alternate implementations S3S4 include (a) as diodes (rectification components) as described in connection with FIGS. 5A/5B, and (b) as transistor switches controlled by the state machine 310 (based on zero crossing inputs).

In alternative embodiments, State machine 310 controls switching of S1 and S2, with inputs from zero crossing comparators 321 and 323, and from an $I_L$ regulation network that includes $I_L$ sense circuitry 330, $V_{OUT}$ sense circuitry 340 and $I_L$ regulation circuitry 350. The IL regulation network provides an IL regulation error signal representative of the change in inductor current $I_L$ required to supply the required regulated output voltage $V_{OUT}$ (i.e., corresponding to the output $\Delta V=V_{OUT}-V_{REF}$, where $V_{REF}$ corresponds to the set regulated voltage.

Based on the $I_L$ regulation error signal (and the zero crossing signals ZC3 and ZC4), state machine 310 controls S1 and S2 to provide, in conjunction with zero crossing comparators 323 and 324, and the coordinated control of S3 and S4, buck-boost regulation according to the buck-boost regulation methodology, including buck-boost transition switching control, of the invention.

State machine 310, and the associated $I_L$ regulation network ($I_L$ sense circuitry 330, $V_{OUT}$ sense circuitry 340 and $I_L$ regulation circuitry 350) form the core of the switching controller for buck-boost regulator 300. $I_L$ sense circuitry 330 provides an $I_L$ sense signal representative of the inductor current $I_L$. $V_{OUT}$ sense circuitry 340 provides a voltage regulation error signal representative of a difference between an output voltage supplied to the load (based on $I_L$), and the regulated output voltage ($\Delta V=V_{OUT}-V_{REF}$). $I_L$ regulation circuitry 350 provides an $I_L$ regulation error signal based on the $I_L$ sense signal, and the voltage regulation error signal. In response to the $I_L$ regulation error signal (and the ZC3/ZC4 zero crossing signals that control S3/S4), state machine 300 controls the switching of S1 and S2 such that the switching converter supplies inductor current $I_L$ required for the regulated output voltage.

IL regulation circuitry 350 is implemented with an error comparator 351 that provides the $I_L$ regulation error signal based on an error comparison of an $I_L$ sense current and a voltage regulation error current representative of actual $V_{OUT}$ (at output node N3) relative to the desired regulated output voltage ($V_{REF}$). $I_L$ sense circuitry 330 provides the $I_L$ sense current representative of the inductor current $I_L$. $V_{OUT}$ sense circuitry 340 is implemented as a transconductance amplifier 345 that outputs the voltage regulation error current based on the difference between the actual output voltage $V_{OUT}$ supplied to the load (based on $I_L$), and a reference voltage 346 corresponding to the regulated output voltage ($V_{REF}$).

$I_L$ sense circuitry 330 and $V_{OUT}$ sense circuitry 340 (transconductance amplifier 345) are coupled at a current subtraction node 355, such that a resulting $I_L$ regulation current out of the current subtraction node corresponds to a difference between the voltage regulation error current from transconductance amplifier 345 and the IL sense current from $I_L$ sense circuitry 330.

Error comparator 351 provides the $I_L$ regulation error signal based on the $I_L$ regulation current relative to a comparator reference 352. Comparator reference 352 can be configured to provide a predetermined hysteresis level.

Figures 1, 4B:
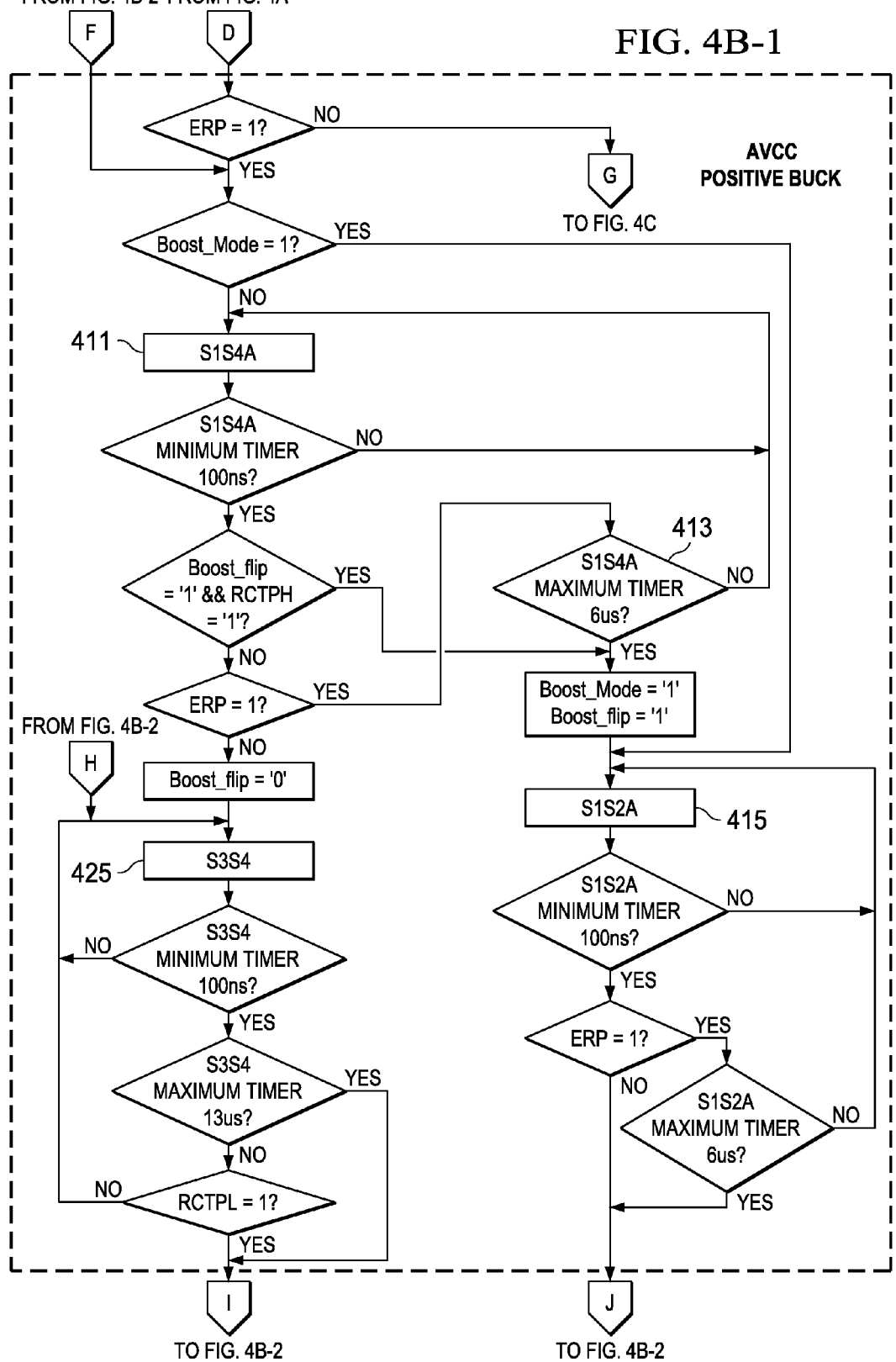
Figures 2, 4B:
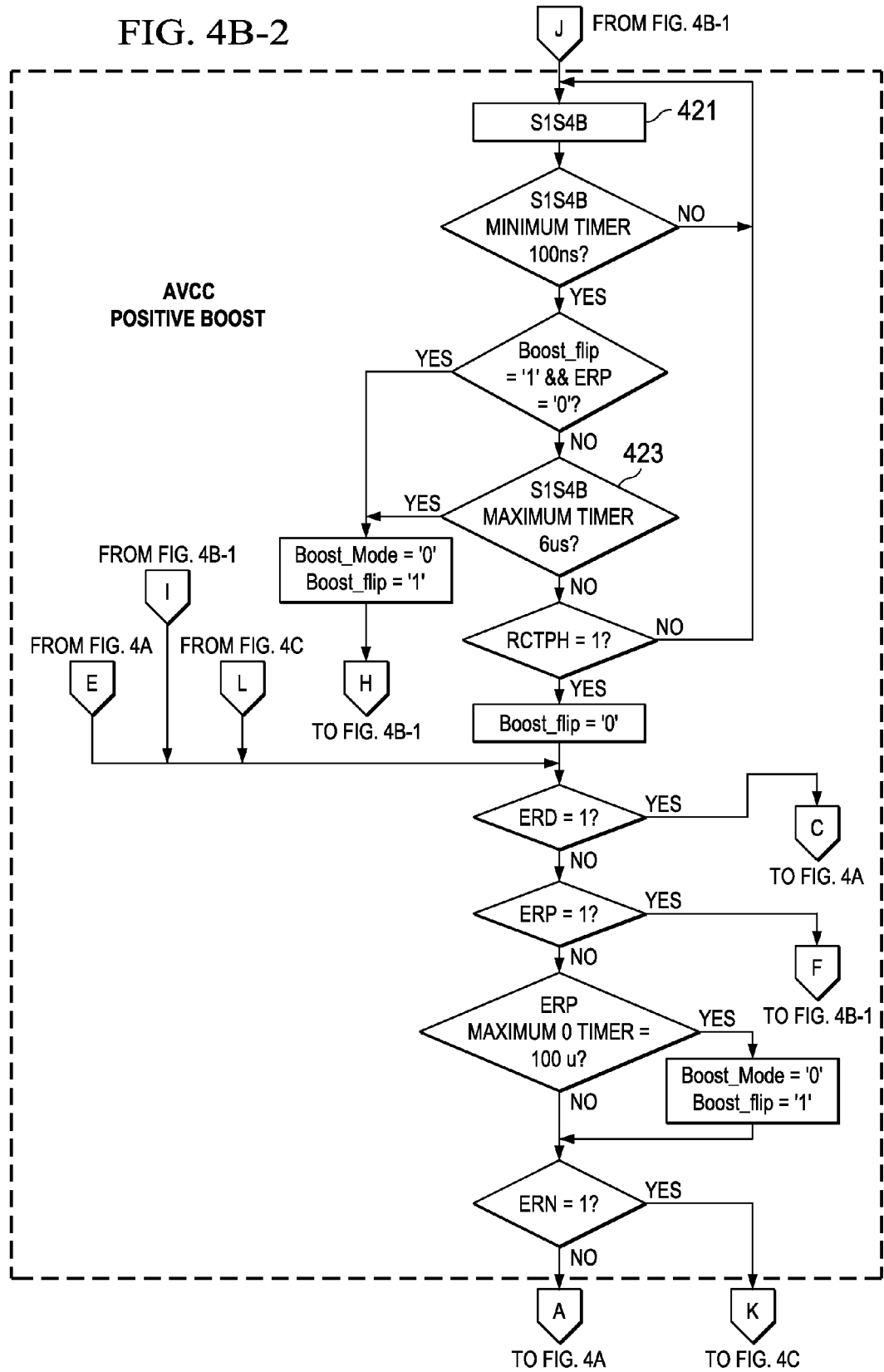
Figure 4C:
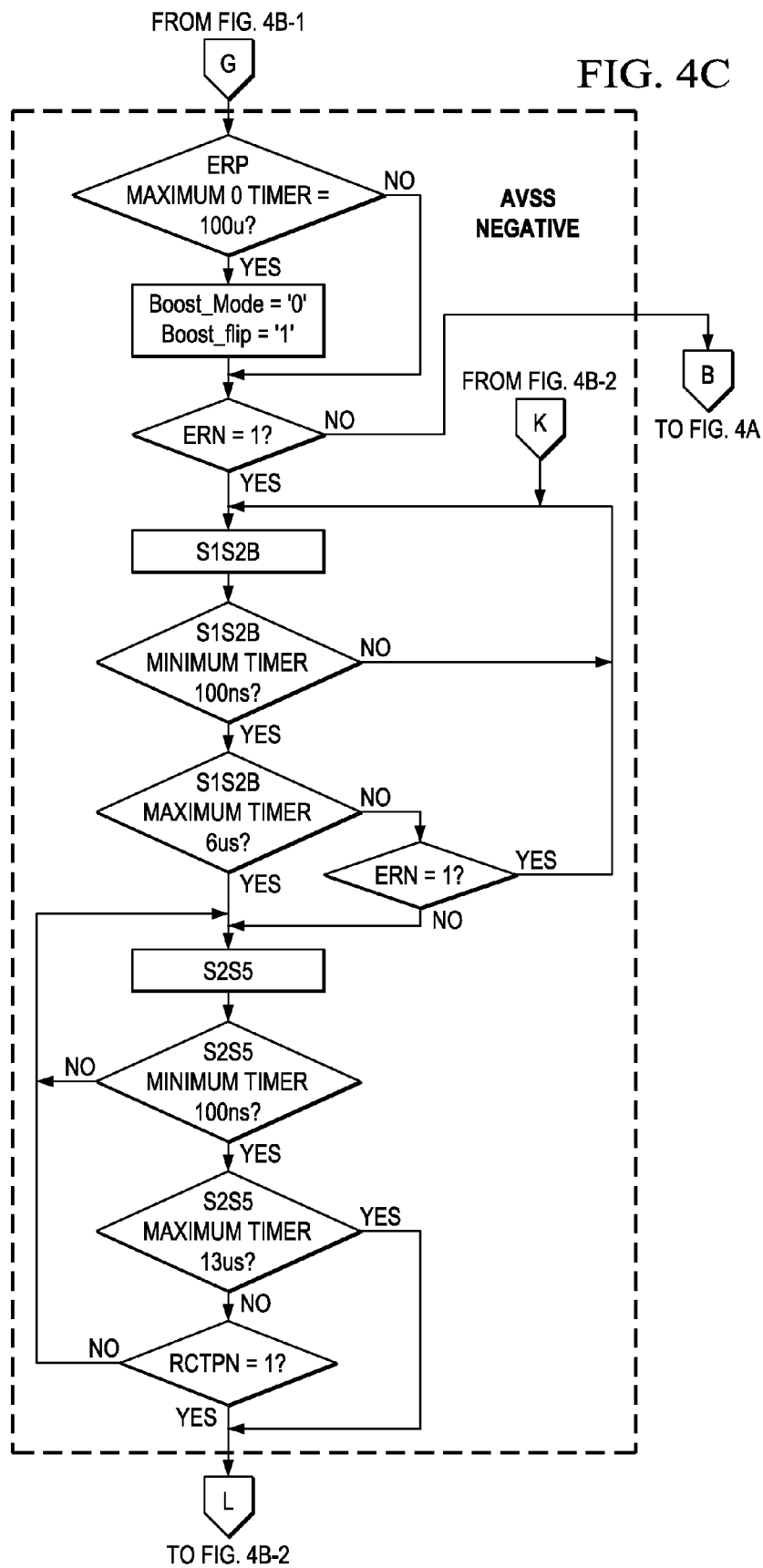

FIGS. 4A-4C illustrate example flow diagrams representing a state machine implementation of a buck-boost switching control methodology, including buck-boost transition switching control according to the invention. The illustrative flow diagrams in FIGS. 4A-4C are provided in relation to the SIMO buck-boost regulator 100B illustrated in FIG. 1B, with a six transistor switching network S1-S6, including separate flows for regulated output voltages AVCC (S1-S4), DVCC (S1-S4+S6) and AVSS (S1-S4+S5).

Referring first to FIG. 1B, the example SIMO buck-boost regulator 110B, including a six transistor switching network S1-S6, is configured for converting input power from an input power source $V_{IN}$ (for example, AVDD +18V to +36V) into multiple positive and negative regulated output voltages, for example AVCC (+3V to +30V) at output node N3 (output capacitor C1); DVCC (+3V) at output node N4 (output capacitor C4); and AVSS (−7V to −30V) at output node N5 (output capacitor C5). FIGS. 1A illustrates a simplified SISO version of this buck-boost regulator, including a four transistor switching network S1-S4 where only AVCC regulation is illustrated.

FIG. 4A illustrates an example buck-boost switching control methodology for the three SIMO regulated output voltages (AVCC, DVCC and AVSS) illustrated in FIG. 1B, including control for an associated six transistor switching network (but with S3/S4 controlled by zero crossing comparators as illustrated in FIG. 3). FIG. 4B expands the regulation flows for the AVCC regulation illustrated in both SISO (FIG. 1A) and SIMO (FIG. 1B) embodiments, and including buck-boost transition switching control according to the invention. FIG. 4C expands the regulation flows for DVCC and AVSS regulation.

Referring to FIG. 4B, the state machine implementation of the buck-boost transition switching control methodology is here described in connection with the control of a four-transistor switching network S1-S4 for a single regulated output (AVCC), such as illustrated in FIG. 1A for a SISO buck-boost regulator. The buck-boost transition switching methodology is operable to control inductor charging and discharging during buck-boost transition conditions represented by an inductor charge time that exceeds a predetermined max charge time, and an inductor discharge time the exceeds a predetermined max discharge time. This description for the SISO embodiment with a four-transistor switching network extends to the SIMO embodiment in FIG. 1B with multiple regulated output voltages (AVCC, DVCC and AVSS), with appropriate control for the additional switches S5 and S6 (which can both be implemented as diodes or other rectification components as illustrated in FIG. 1B), although S5/S6 do not require buck-boost transition control.

Referring also to FIG. 1A and the functional illustration in FIG. 2 (relevant reference numerals are the same in both Figures), the buck-boost transition switching methodology includes charge and discharge transition cycles, each with two phases: (a) a charge cycle (inductor charging) with phases/states S1S4A and S1S2, and (b) a discharge cycle (inductor discharging) with phases/states S1S4B and S3S4. The phases S1S2 and S3S4 respectively ground inductor nodes N2 and N1, thereby respectively enabling (a) a rapid increase in inductor charge current, and (b) a rapid increase in inductor discharge current.

The charge cycle includes phases/states S1S4A (411) and S1S2 (413), and an associated max timer 415 for setting the max charge time. The discharge cycle includes phases/states S1S4B (421) and S3S4 (423), and an associated max timer 415 for setting the max discharge time.

During the charge cycle, the switching control method includes switching S1/S4 on and S2/S3 off (S1S4A state 411), charging the inductor during the max charge time (max timer 415) with an S1S4A $I_L$ current ramp. At the end of the max charge time (415), if inductor current $I_L$ is less than a predetermined peak current $I_{L\_MAX}$, then in response, S4 is switched off and S2 on (S1S2 state 413) to ground the corresponding inductor node (N2), so that inductor current $I_L$ increases to an S1S2 $I_L$ current ramp greater in magnitude than the S1S4A $I_L$ current ramp, charging the inductor. When $I_L$ ramps to $I_{L\_MAX}$, the state machine transitions to the discharge transition cycle.

During the discharge cycle, the switching control method includes switching S1/S4 on and S2/S3 off (S1S4B state 421), so that the inductor discharges with an S1 S4B $I_L$ current ramp during the max discharge time (max timer 425). At the end of the max discharge time (425), if inductor current $I_L$ is greater than zero, then in response, S1 is switched off and S3 on (S3S4 state 423) to ground the corresponding inductor node (N1), so that the inductor current $I_L$ increases to an S3S4 $I_L$ current ramp greater in magnitude than the S1S4A $I_L$ current ramp, discharging the inductor. When $I_L$ ramps to zero, the state machine can transition back to the charge transition cycle.

Thus, for a four-transistor S1-54 embodiment illustrated in FIG. 1A and represented in FIG. 2, the state machine implementation illustrated in FIG. 4C proceeds from: (a) inductor charge—state S1S4A (411) to state S1S2 (413), and then (b) inductor discharge—from S1S4B (421) to S3S4 (423). Respective max timers 415 and 425 are used to configure the buck-boost transition condition represented by an inductor charge time that exceeds a max charge time (415), and an inductor discharge time the exceeds a max discharge time (425).

Figure 5A:
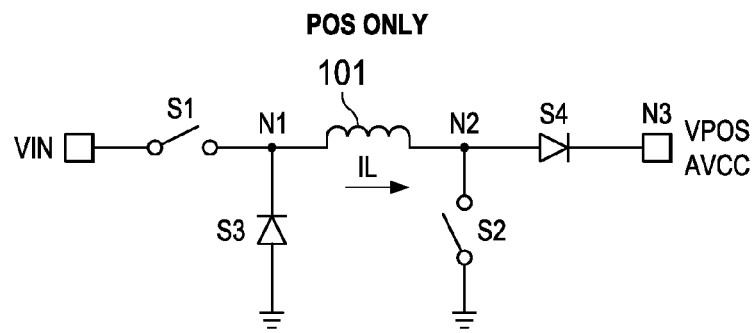
FIGS. 5A and 5B, illustrate example embodiments of a buck-boost single inductor converter topology, such as can be used with the buck-boost transition switching control methodology according to the invention, and in which one or more switches are replaced by diodes: (A) a positive-only embodiment in which the regulated output voltage is positive (VPOS), with diodes replacing transistor switches S3 and S4; and (B) a positive/negative embodiment in which the regulated output voltage can be positive (VPOS) or negative (VNEG), with a diode replacing transistor switch S4 (and including the addition of a diode S5).
Figure 5B:
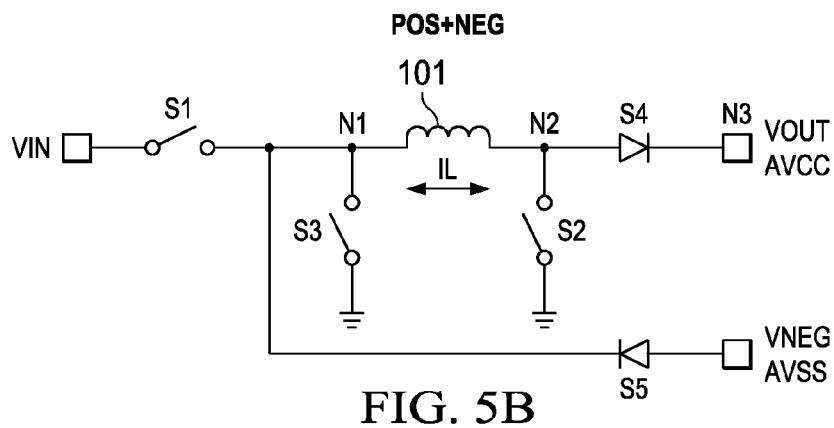

FIGS. 5A and 5B illustrate example embodiments of a single inductor buck-boost converter topology, such as can be used with the buck-boost transition switching control methodology according to the invention, where one or more transistor switches of the switching network are replaced by diodes (rectification components). FIG. 5A illustrates a positive-only embodiment in which the regulated output voltage is positive (VPOS), with diodes replacing transistor switches S3 and S4 (four switch network). FIG. 5B illustrates a positive/negative embodiment in which the regulated output voltage can be positive (VPOS) or negative (VNEG), with diodes replacing transistor switch S4, and the additional switch S5 associated with the negative regulated output (AVSS).

Referring also to FIGS. 1A/1B and 3, for positive-only embodiments such as illustrated in FIGS. 5A, 1A and 3, S3 and/or S4 can be implemented as either a transistor switch controlled by a respective zero crossing comparator ZCC3/ZCC4 (or otherwise controlled as a diode), or replaced by a diode. Similarly, for positive-negative embodiments such as illustrated in FIGS. 5B and 1B, S4 can be either a transistor switch controlled by a zero crossing comparator ZCC4 (or otherwise controlled as a diode), or replaced by a diode. The additional S5 for the negative output VNEG (AVSS) can be either a diode (FIG. 5A), or a transistor (FIG. 1B) controlled as a diode by the switching control network.

Thus, for the embodiment illustrated in FIG. 5A, a related switching network includes: (a) a switch S1 coupled to an input power source $V_{IN}$, and coupled to an inductor node N1, (ii) a switch S2 coupled between an inductor node N2 and ground, (iii) a diode (rectification component) S3 coupled between inductor node N1 and ground and configured to conduct forward current in a forward direction into N1, and block reverse current in a reverse direction, and (iv) a diode (rectification component) S4 coupled between inductor node N2 and output node N3, and configured to conduct forward current from inductor node N2 to output node N3 and to block reverse current from the output node.

For this buck boost regulator embodiment in which the switching network includes transistor switches S1S2 and diodes (rectification components) S3S4, buck-boost transition switching control can be implemented as follows. During buck-boost transition conditions (as represented by an inductor charge time that exceeds the max charge time, and an inductor discharge time the exceeds the max discharge time), the switching controller transitions between charge and discharge transition cycles, respectively charging and discharging the buck-boost inductor 101.

During the charge cycle, the switching controller controls charging the inductor by: (a) switching S1 on and S2 off, with the diode (rectification component) S3 arranged to block reverse current from the input power source to ground, and with diode (rectification component) S4 conducting forward current, such that inductor current $I_L$ charges the inductor with an S1S4A $I_L$ current ramp, (b) determining, at the end of the max charge time, that $I_L$ is less than a predetermined peak current $I_{L\_MAX}$, and in response (c) switching S2 on to ground the second inductor node, with diode (rectification component) S4 blocking any reverse current from the output node to the second inductor node, so that $I_L$ increases to an S1S2 $I_L$ current ramp greater in magnitude than the S1S4A $I_L$ current ramp, until $I_L$ reaches $I_{L\_MAX}$. When $I_L$ ramps to $I_{L\_MAX}$, the switching controller transitions to the discharge transition cycle.

During the discharge cycle, the switching controller controls discharging the inductor by: (a) switching S1 on and S2 off, with the diode (rectification component S3) arranged to block reverse current from the input power source to ground, such that the inductor discharges with an S1S4B $I_L$ current ramp, (b) determining, at the end of the max discharge time, that $I_L$ is greater than zero, and in response (c) switching S1 off, with the diode (rectification component) S3 arranged to connect the first inductor node to ground, so that $I_L$ increases to an S3S4 $I_L$ current ramp greater in magnitude than the S1S4A $I_L$ current ramp. When $I_L$ ramps to zero, the switching controller can transition back to the charge cycle.

The Disclosure provided by this Description and the Figures sets forth example embodiments and applications, including associated operations and methods, that illustrate various aspects and features of the invention. These example embodiments and applications may be used by those skilled in the art as a basis for design modifications, substitutions and alternatives to construct other embodiments, including adaptations for other applications. Accordingly, this Description does not limit the scope of the invention, which is defined by the Claims.

The invention claimed is:

1. A buck-boost switching converter circuit for converting input power from an input power source into regulated output power supplied to a load, comprising:
    a switching network coupled to first and second inductor nodes and an output node;
    the first and second inductor nodes configured to couple to respectively first and second ends of an inductor, and the output node configured to couple to an output capacitor and in parallel to the load;
    the switching network including: (i) a switch S1 configured to couple to the input power source, and coupled to the first inductor node, (ii) a switch S2 coupled between the second inductor node and ground, (iii) a rectification component S3 coupled between the first inductor node and ground and configured to conduct forward current in a forward direction, and block reverse current in a reverse direction, and (iv) a rectification component S4 coupled between the second inductor node and the output node, and configured to conduct forward current from the second inductor node to the output node and to block reverse current from the output node to the second inductor node;
    a switching controller configured to control the switching network to control inductor current $I_L$, including inductor charge and discharge, to provide power conversion in three modes:
        a buck mode providing down conversion when the input power is greater than the regulated output power by a buck transition parameter corresponding to a predetermined max charge time;
        a boost mode providing up conversion when the input power is less than the regulated output power by a boost-transition parameter corresponding to a predetermined max discharge time; and
        a transition mode enabled when the difference between the input power and the regulated output power corresponds to a buck-boost transition condition as represented by an inductor charge time that exceeds the max charge time, and an inductor discharge time the exceeds the max discharge time, the transition mode comprising transitioning between charge and discharge transition cycles in which:
            during the charge cycle, the switching controller controls charging the inductor by (i) switching S1 on and S2 off, with the rectification component S3 configured to block reverse current from the input power source to ground, such that inductor current $I_L$ charges the inductor with an S1S4A $I_L$ current ramp, (ii) determining, at the end of the max charge time, that $I_L$ is less than a predetermined peak current $I_{L\_MAX}$, and in response (iii) switching S2 on to ground the second inductor node (rectification component S4 blocking any reverse current from the output node to the second inductor node), so that $I_L$ increases to an S1S2 $I_L$ current ramp greater in magnitude than the S1S4A $I_L$ current ramp, until $I_L$ reaches $I_{L\_MAX}$; and
            during the discharge cycle, the switching controller controls discharging the inductor by: (i) switching S1 on and S2 off, with the rectification component S3 configured to block reverse current from the input power source to ground, such that the inductor discharges with an S1S4B $I_L$ current ramp, (ii) determining, at the end of the max discharge time, that $I_L$ is greater than zero, and in response (ii) switching S1 off, with the rectification component S3 configured to connect the first inductor node to ground, so that $I_L$ increases to an S3S4 $I_L$ current ramp greater in magnitude than the S1S4A $I_L$ current ramp, until $I_L$ reaches zero.

2. The switching converter circuit of claim 1, wherein a regulated output voltage is one of (i) positive or negative, or (ii) positive only, and wherein:
    if the regulated output voltage is positive only, then the rectification component S3 is one of a diode, and a transistor switch controlled as a diode by the switching controller; and
    if the regulated output voltage is positive or negative, then the output node coupled to S4 is a positive output node, and the rectification component S3 is a transistor switch controlled by the switching controller; and the switching network further includes a diode S5 coupled between the first inductor node and a negative output node, in parallel with S3, with S5 configured to conduct forward current from the negative output node through the first inductor node to the inductor.

3. The switching converter circuit of claim 1, wherein the rectification component S4 is one of a diode, and a transistor switch controlled as a diode by the switching controller.

4. The switching converter circuit of claim 1, wherein the rectification components S3 and S4 are transistor switches, and wherein the switching controller includes:

zero-crossing comparators ZCC3 and ZCC4 configured to provide respectively
 (i) a zero crossing signal ZC3 indicating when the inductor current $I_L$ through S3 and the first inductor node is zero, and
 (ii) a zero crossing signal ZC4 indicating when the inductor current $I_L$ through the second inductor node and S4 is zero; and wherein, during the discharge transition cycle, the switching controller is configured to switch S3 and S4 from conducting to non-conducting in response to the respective zero crossing signals ZC3 and ZC4.

5. The switching converter of claim 4, wherein the switching controller comprises:

the zero crossing comparators ZCC3 and ZCC4 configured to provide respective zero crossing signals ZC3 and ZC4, and to control switching of respectively S3 and S4;

a state machine configured to control switching of S1 and S2 based on the zero crossing signals ZC3 and ZC4, and an $I_L$ regulation error signal; and $I_L$ regulation circuitry configured to provide the $I_L$ regulation error signal based on (i) an $I_L$ sense signal representative of the inductor current $I_L$, and (ii) a voltage regulation error signal representative of a difference between an output voltage supplied to the load (based on $I_L$), and the regulated output voltage;

such that the switching converter supplies inductor current $I_L$ corresponding to the regulated output voltage.

6. The switching converter of claim 5:

further comprising $I_L$ sense circuitry configured to provide an $I_L$ sense current representative of the inductor current $I_L$;

further comprising $V_{OUT}$ sense circuitry including
 a reference voltage corresponding to the regulated output voltage; and
 a transconductance amplifier configured to output a voltage regulation error current corresponding to a difference between an output voltage supplied to the load (based on $I_L$), and the reference voltage; and wherein the $I_L$ regulation circuitry comprises:
 a current subtraction node coupled to the output of the transconductance amplifier and the $I_L$ sense circuitry, such that a resulting $I_L$ regulation current out of the current subtraction node corresponds to a difference between the voltage regulation error current and the IL sense current; and
 an error comparator configured to provide the $I_L$ regulation error signal based on the $I_L$ regulation current relative to a comparator reference.

7. The switching converter of claim 6, wherein the comparator reference corresponds to a predetermined hysteresis level.

8. A buck-boost switching regulator for converting input power from an input power source into regulated output power supplied to a load, comprising:

an input power terminal configured to couple to the input power source;

an inductor coupled at a first inductor node to the input power terminal and at a second inductor node to an output node;

an output capacitor coupled to the output node, and parallel coupled to the load;

a switching network coupled to the first and second inductor nodes and the output node, and including (i) a switch S1 coupled between the input power terminal and the first inductor node, (ii) a switch S2 coupled between the second inductor node and ground, (iii) a rectification component S3 coupled between the first inductor node and ground and configured to enable forward current in a forward direction, and block reverse current in a reverse direction, and (iv) a rectification component S4 coupled between the second inductor node and the output node, and configured to enable forward current from the second inductor node to the output node and to block reverse current from the output node to the second inductor node;

a switching controller configured to control the switching network to control inductor current $I_L$, including inductor charge and discharge, to provide power conversion in three modes:
 a buck mode providing down conversion when the input power is greater than the regulated output power by a buck transition parameter corresponding to a predetermined max charge time;
 a boost mode providing up conversion when the input power is less than the regulated output power by a boost-transition parameter corresponding to a predetermined max discharge time; and
 a transition mode enabled when the difference between the input power and the regulated output power corresponds to a buck-boost transition condition as represented by an inductor charge time that exceeds the max charge time, and an inductor discharge time the exceeds the max discharge time, the transition mode comprising transitioning between charge and discharge transition cycles in which:
  during the charge cycle, the switching controller controls charging the inductor by (i) switching S1 on and S2 off, with the rectification component S3 configured to block reverse current from the input power source to ground, such that inductor current $I_L$ charges the inductor with an S1S4A $I_L$ current ramp, (ii) determining, at the end of the max charge time, that $I_L$ is less than a predetermined peak current $I_{L\_MAX}$, and in response (iii) switching S2 on to ground the second inductor node (rectification component S4 blocking any reverse current from the output node to the second inductor node), so that $I_L$ increases to an S1S2 $I_L$ current ramp greater in magnitude than the S1S4A $I_L$ current ramp, until $I_L$ reaches $I_{L\_MAX}$; and
  during the discharge cycle, the switching controller controls discharging the inductor by: (i) switching S1 on and S2 off, with the rectification component S3 configured to block reverse current from the input power source to ground, such that the inductor discharges with an S1S4B $I_L$ current ramp, (ii) determining, at the end of the max discharge time, that $I_L$ is greater than zero, and in response (iii)

switching S1 off, with the rectification component S3 configured to connect the first inductor node to ground, so that $I_L$ increases to an S3S4 $I_L$ current ramp greater in magnitude than the S1S4A $I_L$ current ramp, until $I_L$ reaches zero.

9. The switching regulator of claim 8, wherein a regulated output voltage is one of (i) positive or negative, or (ii) positive only; and wherein:
   if the regulated output voltage is positive only, then the rectification component S3 is one of a diode, and a transistor switch controlled as a diode by the switching controller; and
   if the regulated output voltage is positive or negative, then the output node coupled to S4 is a positive output node, and
      the rectification component S3 is a transistor switch controlled by the switching controller; and
      the switching network further includes a diode S5 coupled between the first inductor node and a negative output node, in parallel with S3, with S5 configured to conduct forward current from the negative output node through the first inductor node to the inductor.

10. The switching regulator of claim 8, wherein the rectification component S4 is one of a diode, and a transistor switch controlled as a diode by the switching controller.

11. The switching regulator of claim 8, wherein the rectification components S3 and S4 are transistor switches, and wherein the switching controller includes:
   zero-crossing comparators ZCC3 and ZCC4 configured to provide respectively
      (i) a zero crossing signal ZC3 indicating when the inductor current $I_L$ through S3 and the first inductor node is zero, and
      (ii) a zero crossing signal ZC4 indicating when the inductor current $I_L$ through the second inductor node and S4 is zero; and
   wherein, during the discharge transition cycle, the switching controller is configured to switch S3 and S4 from conducting to non-conducting in response to the respective zero crossing signals ZC3 and ZC4.

12. The switching regulator of claim 11, wherein the switching controller comprises:
   the zero crossing comparators ZCC3 and ZCC4 configured to provide respective zero crossing signals ZC3 and ZC4, and to control switching of respectively S3 and S4;
   a state machine configured to control switching of S1 and S2 based on the zero crossing signals ZC3 and ZC4, and an $I_L$ regulation error signal; and
   $I_L$ regulation circuitry configured to provide the $I_L$ regulation error signal based on (i) an $I_L$ sense signal representative of the inductor current $I_L$, and (ii) a voltage regulation error signal representative of a difference between an output voltage supplied to the load (based on $I_L$), and the regulated output voltage;
   such that the switching converter supplies inductor current $I_L$ corresponding to the regulated output voltage.

13. The switching regulator of claim 12:
   further comprising $I_L$ sense circuitry configured to provide an $I_L$ sense current representative of the inductor current $I_L$;
   further comprising $V_{OUT}$ sense circuitry including
      a reference voltage corresponding to the regulated output voltage; and
      a transconductance amplifier configured to output a voltage regulation error current corresponding to a difference between an output voltage supplied to the load (based on $I_L$), and the reference voltage; and
   wherein the $I_L$ regulation circuitry comprises:
      a current subtraction node coupled to the output of the transconductance amplifier and the $I_L$ sense circuitry, such that a resulting $I_L$ regulation current out of the current subtraction node corresponds to a difference between the voltage regulation error current and the IL sense current; and
      an error comparator configured to provide the $I_L$ regulation error signal based on the $I_L$ regulation current relative to a comparator reference.

14. The switching regulator of claim 13, wherein the comparator reference corresponds to a predetermined hysteresis level.

15. A method of buck-boost regulation for converting input power from an input power source into regulated output power supplied to a load, operable with a buck-boost regulator including an inductor coupled at a first inductor node to the input power source and at a second inductor node to an output node, and an output capacitor coupled to the output node, in parallel with the load, and including a switching network with a switch S1 coupled between the input power source and the first inductor node, a switch S2 coupled between the second inductor node and ground, a rectification component S3 coupled between the first inductor node and ground and configured to enable forward current in a forward direction, and block reverse current in a reverse direction, and a rectification component S4 coupled between the second inductor node and the output node, and configured to enable forward current from the second inductor node to the output node and to block reverse current from the output node to the second inductor node, the method comprising:
   controlling the switching network to control inductor current $I_L$, including inductor charge and discharge, to provide power conversion in three modes:
      a buck mode providing down conversion when the input power is greater than the regulated output power by a buck transition parameter corresponding to a predetermined max charge time;
      a boost mode providing up conversion when the input power is less than the regulated output power by a boost-transition parameter corresponding to a predetermined max discharge time; and
      a transition mode enabled when the difference between the input power and the regulated output power corresponds to a buck-boost transition condition as represented by an inductor charge time that exceeds the max charge time, and an inductor discharge time the exceeds the max discharge time;
   during the transition mode, controlling the switching network to transition between charge and discharge transition cycles such that:
      during the charge cycle, controlling charging the inductor by:
         switching S1 on and S2 off, with the rectification component S3 configured to block reverse current from the input power source to ground, such that inductor current $I_L$ charges the inductor with an S1S4A $I_L$ current ramp;
         determining, at the end of the max charge time, that $I_L$ is less than a predetermined peak current $I_{L\_MAX}$; and in response
         switching S2 on to ground the second inductor node (rectification component S4 blocking any reverse current from the output node to the second inductor node), so that $I_L$ increases to an S1S2 $I_L$ current ramp greater in magnitude than the S1S4A $I_L$ current ramp, until $I_L$ reaches $I_{L\_MAX}$; and during the discharge cycle, controlling discharging the inductor by:
  switching S1 on and S2 off, with the rectification component S3 configured to block reverse current from the input power source to ground, such the inductor discharges with an S1S4B $I_L$ current ramp;
  determining, at the end of the max discharge time, that $I_L$ is greater than zero; and in response, switching S1 off, with the rectification component S3 configured to connect the first inductor node to ground, so that $I_L$ increases to an S3S4 $I_L$ current ramp greater in magnitude than the S1S4A $I_L$ current ramp, until $I_L$ reaches zero.

16. The method of claim 15, wherein a regulated output voltage is one of (i) positive or negative, or (ii) positive only; and wherein:
  if the regulated output voltage is positive only, then the rectification component S3 is one of a diode, and a transistor switch controlled as a diode; and
  if the regulated output voltage is positive or negative, then the output node coupled to S4 is a positive output node, and
  the rectification component S3 is a transistor switch, and controlling the switching network to control inductor current $I_L$ includes controlling S3; and
  the switching network further includes a diode S5 coupled between the first inductor node and a negative output node, in parallel with S3, with S5 configured to conduct forward current from the negative output node through the first inductor node to the inductor.

17. The method of claim 15, wherein the rectification component S4 is one of a diode, and a transistor switch controlled as a diode.

18. The method of claim 15, wherein the rectification components S3 and S4 are transistor switches, and wherein, during the discharge transition cycle, the method includes:
  generating a zero crossing signal ZC3 indicating when the inductor current $I_L$ through S3 and the first inductor node is zero, and
  generating a zero crossing signal ZC3 indicating when the inductor current $I_L$ through the second inductor node and S4 is zero; and
  during the discharge transition cycle, switching S3 and S4 from conducting to non-conducting in response to the respective zero crossing signals ZC3 and ZC4.

19. The method of claim 15, wherein the switching network includes four transistor switches S1-S4, and wherein controlling the switching network is accomplished by:
  generating a zero crossing signal ZC3 indicating when the inductor current $I_L$ through S3 and the first inductor node is zero,
  generating a zero crossing signal ZC4 indicating when the inductor current $I_L$ through the second inductor node and S4 is zero;
  generating an $I_L$ sense signal representative of inductor current $I_L$;
  generating a voltage regulation error signal representative of a difference between an output voltage supplied to the load (based on $I_L$) and the regulated output voltage;
  generating an $I_L$ regulation error signal based on (i) the $I_L$ sense signal, and (ii) the voltage regulation error signal; and
  switching S1-S4 based on the zero crossing signals ZC1 and ZC2, and the $I_L$ regulation error signal, such that that the switching regulator supplies inductor current $I_L$ corresponding to the regulated output voltage.

20. The method of claim 19, wherein generating the IL regulation error signal is accomplished by:
  generating an $I_L$ sense current representative of inductor current $I_L$;
  generating a voltage regulation error current corresponding to the difference between the output voltage supplied to the load (based on $I_L$) and a reference voltage corresponding to the regulated output voltage;
  generating an $I_L$ regulation current based on a subtraction of the $I_L$ the voltage regulation current signal and the IL sense current; and
  generating the $I_L$ regulation error signal based on the $I_L$ regulation current relative to a comparator reference.

* * * * *